(12) United States Patent
Ito (10) Patent No.: US 10,027,124 B2
(45) Date of Patent: Jul. 17, 2018

(54) ELECTRIC POWER SUPPLY SYSTEM CONTROLLER

(71) Applicant: DENSO CORPORATION, Kariya, Aichi-pref. (JP)

(72) Inventor: Akira Ito, Nukata-gun (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 407 days.

(21) Appl. No.: 14/805,555

(22) Filed: Jul. 22, 2015

(65) Prior Publication Data

US 2016/0028237 A1 Jan. 28, 2016

(30) Foreign Application Priority Data

Jul. 24, 2014 (JP) ................................ 2014-150708

(51) Int. Cl.
*H02J 1/00* (2006.01)
*H02J 3/00* (2006.01)
*H02J 3/38* (2006.01)
*H02J 3/32* (2006.01)
*H02J 7/35* (2006.01)
*H02J 1/10* (2006.01)

(52) U.S. Cl.
CPC ............... *H02J 3/383* (2013.01); *H02J 3/32* (2013.01); *H02J 7/35* (2013.01); *H02J 1/102* (2013.01); *Y02E 10/563* (2013.01); *Y02E 10/566* (2013.01); *Y02E 70/30* (2013.01); *Y02P 90/50* (2015.11)

(58) Field of Classification Search
CPC ...... H02J 3/32; H02J 3/383; H02J 7/35; H02J 1/102; Y02E 10/563; Y02E 10/566; Y02E 70/30; Y02P 90/50
USPC ............................................ 307/82
See application file for complete search history.

(56) References Cited

U.S. PATENT DOCUMENTS

| | | | |
|---|---|---|---|
| 2005/0105229 A1* | 5/2005 | Deng | H02J 9/062 361/90 |
| 2012/0181864 A1* | 7/2012 | Honma | H01M 10/44 307/23 |

FOREIGN PATENT DOCUMENTS

| | | |
|---|---|---|
| JP | 2001-298864 | 10/2001 |
| JP | 2012-257406 | 12/2012 |
| JP | 2013-051785 | 3/2013 |
| JP | 2014-011811 | 1/2014 |

* cited by examiner

Primary Examiner — Rexford Barnie
Assistant Examiner — Toan Vu
(74) Attorney, Agent, or Firm — Harness, Dickey & Pierce, P.L.C.

(57) ABSTRACT

A controller has a predicting section which computes a predicted electric energy predicted to be supplied from a power distribution grid to the load during an assessment period which is a predetermined period. The controller has a supply electric energy computing section which computes a supply electric power based on the predicted electric energy, the supply electric energy being an electric energy to be supplied to the load from the electric power converter during the assessment period. The controller has a time computing section which computes a discharge time by dividing the supply electric energy by a rated power of the electric power converter. The controller has a control section which controls the electric power converter so that an electric power corresponding to the rated power is supplied to the load only for the discharge time within the assessment period.

1 Claim, 5 Drawing Sheets

ELECTRIC POWER SUPPLY SYSTEM CONTROLLER

CROSS REFERENCE TO RELATED APPLICATION

This application is based on Japanese Patent Application No. 2014-150708 filed on Jul. 24, 2014, the disclosure of which is incorporated herein by reference.

TECHNICAL FIELD

The present disclosure relates to a controller for a power supply system which supplies electric power stored in a battery to a load through an electric power converter.

BACKGROUND

Electric power supplied to a consumer such as a building from a power distribution grid may widely vary according to working conditions of electric power consuming devices (loads). So, in many cases, heavy consumers, such as industrial plants who consume great electric power, are equipped with local power supply systems each of which has a battery for in order to equalize (peak-cut-operation) the electric power supplied from the power distribution grid. This kind of power supply system stores electric power in the battery in a time zone, e.g., night, with comparatively little amount of electric power used, and supplies electric power from the battery in a time zone with comparatively much amount of electric power used. Since the maximum amount of electric power, i.e., peak amount, supplied from the power distribution grid may be suppressed by having the power supply system, the consumer may reduce payment, i.e., a contracted basic fee, for supplying electricity to a power supply company.

In general, an electric power converter, such as a DC/DC converter, is disposed between the battery and a power supply line connected with a load. The electric power converter adjusts voltage between the power supply line and the battery, and connects both. Electric power stored in the battery is boosted by the electric power converter, and then, supplied to the load through the power supply line.

It is known that an operating efficiency of the electric power converter may be the highest when it is operated to output the rated power. In other words, an operating efficiency of the electric power converter is lowered when outputting power lower than the rated power. Based on this, the power supply system disclosed in Patent Literature 1 is configured to estimate a time zone at which a power consumption of the consumer is kept continuously great, i.e., a time zone at which the electric power converter may continuously output the rated power, and to supply electric power from the power supply system at the estimated time zone. Since the electric power converter may be continuously operated at high efficiencies, it is possible to effectively output the storage electric power in the battery and supply it to the load.

Patent Literatures

Patent Literature 1: JP2012-257406A

SUMMARY

In the power supply system disclosed in Patent Literature 1, the system is controlled to supply power to the load only at the time zone in which a power consumption by the consumer is continuously kept high level, i.e., only at the time zone in which the electric power converter can output the rated power continuously for a long time. Accordingly, in a case that an amount of electric power consumed by the consumer increases temporarily at out of the time zone described above, power supply to the load is not performed, and electric power supplied from the power distribution grid may increase adversely.

In order to prevent the above mentioned disadvantages, a control for equalizing electric power supplied from the power distribution grid in all of the time zones may be tried. However, in this case, a time zone in which the power supply system outputs lower electric power than the rated power is also produced. In other words, this time zone may be referred to as a time zone in which if the rated power is continuously outputted, power supply from the power supply system may become excessive level. In such a time zone, the operating efficiency of the electric power converter may be lowered. Power loss may also increase.

It is an object of the present disclosure to provide an electric power supply system controller which is capable of operating a power supply system with a high efficiency.

It is another object of the present disclosure to provide an electric power supply system controller which is capable of operating a power supply system with a high efficiency while equalizing electric power supplied from an electric distribution grid.

It is still another object of the present disclosure to provide an electric power supply system controller which is capable of operating a power supply system with a high efficiency while shortening a period of peak power consumption.

An electric power supply system controller for a power supply system is provided. The system supplies electric power charged in a battery to a load through an electric power converter. The controller comprises a predicting section which computes a predicted electric energy predicted to be supplied from a power distribution grid to the load during an assessment period which is a predetermined period. The controller comprises a supply electric energy computing section which computes a supply electric power based on the predicted electric energy, the supply electric energy being an electric energy to be supplied to the load from the electric power converter during the assessment period. The controller comprises a time computing section which computes a discharge time by dividing the supply electric energy by a rated power of the electric power converter. The controller comprises a control section which controls the electric power converter so that an electric power corresponding to the rated power is supplied to the load only for the discharge time within the assessment period.

The controller does not perform electric power output from the electric power converter to the load during the assessment period entirely, but performs electric power output for a limited period (discharge time) that is a part of the assessment period. Amount of electric power being outputted from the electric power converter for the limited period corresponds to the rated power of the electric power converter. As a result, it is possible to operate the electric power converter with a high efficiency, and to supply electric power charged in the battery with less power loss.

As a result of performing the above control, in time zones other than the discharge time in the assessment period, electric power output from the electric power converter to the load is not performed. However, since the discharge time is computed by dividing the supply electric energy with the rated power of the electric power converter, the electric energy supplied to the load from the power supply system in the assessment period becomes equal to the supply electric energy determined based on the predicted electric energy. Accordingly, when evaluating for the whole assessment period, the electric energy supplied to the load does not become an excess or shortage.

Even if electric power is supplied from the DC/DC converter to the load for time slightly shorter or longer than the discharge time, the advantages of this disclosure may be achieved when electric power is supplied for time corresponding to the discharge time computed as mentioned above.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

A plurality of embodiments of the present disclosure are explained referring to the drawings. In order to make an understanding of description easy, in each drawing, the same reference symbols are used for the same element and redundant description will be omitted.

Figure 1:
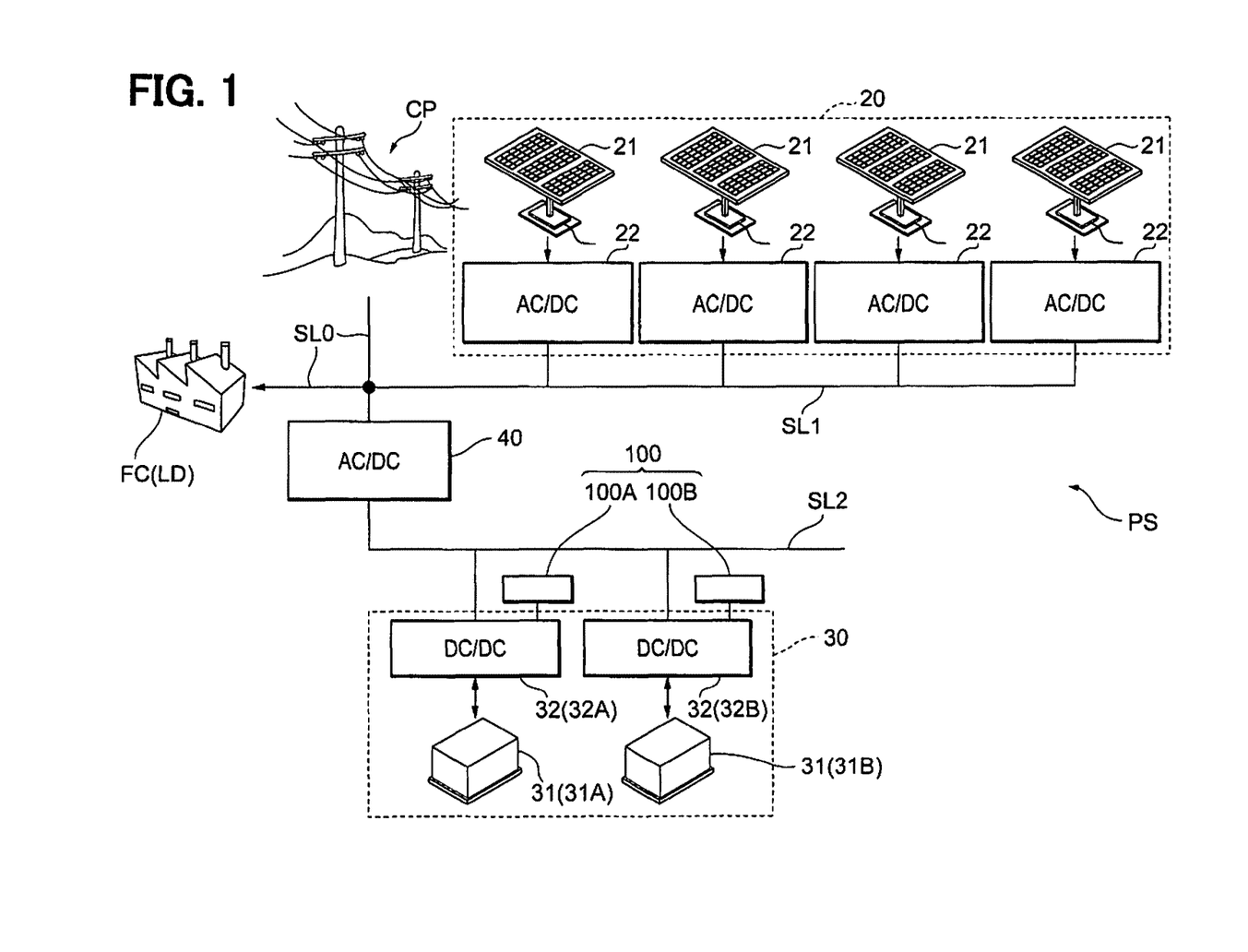
FIG. 1 is a diagram showing a power distribution network including a power supply system in an embodiment.

First, referring to FIG. 1, a power supply system PS subject to control of the controller 100 in this embodiment is explained. The power supply system PS is configured as a system for supplying electric power to a factory FC.

The factory FC also receives electric power supply from a power distribution grid CP which is a commercial base power. The power distribution grid CP and the factory FC are connected by a power supply line SL0 which is an AC bus line. AC electric power of three phases 200V is supplied to the factory FC from the power distribution grid CP through the power supply line SL0. Devices (loads) that use electric power supplied in the factory FC works and functions by receiving electric power supply mainly from the power distribution grid CP. In subsequent description, the whole devices in the factory FC may be collectively referred to as a load FC.

The power supply system PS is connected in the middle of the power supply line SL0 which connects the power distribution grid CP and the factory FC. The power supply system PS works as a device for reducing electric power supplied to the load LD from the power distribution grid CP by supplying auxiliary electric power to the load LD through the power supply line SL0. The power supply system PS has a solar generator unit 20, a battery unit 30, and a grid interconnection inverter 40.

The solar generator unit 20 is a device for transforming sunlight energy into electric power and supplying this electric power to the load LD. Electric power from the solar generator unit 20 is supplied to the load LD through the power supply line SL1 and the power supply line SL0. The power supply line SL1 is an AC bus line of which one end is connected to the power supply line SL0.

The solar generator unit 20 has a solar generator panel 21 and an inverter 22. The solar generator panel 21 generates power by transforming sunlight energy directly into electric power, and is installed on a roof of the factory FC. The system has a plurality of solar generator units 20.

The inverter 22 is an electric power converter for transforming DC power generated in the solar generator panel 21 into AC power of three phases 200V, and for supplying transformed electric power to the power supply line SL1. The inverter 22 is disposed to the solar generator panel 21. As shown in FIG. 1, in this embodiment, 4 sets of the solar generator panels 21 and the inverters 22 are connected in parallel to the power supply line SL1. The number of the solar generator panel 21 and the inverter 22 is not restricted to four sets. The number may be increased or decreased according to scale of the factory FC or a performance level of the solar generator panel 21.

In a fine weather daytime, electric power is supplied to the load LD from the solar generator unit 20. Thereby, electric power supply from the power distribution grid CP to the load LD is reduced, and a payment to the power supply company can also be reduced.

The battery unit 30 is an apparatus for charging temporarily electric power which is not consumed by the load LD and is supplied from the solar generator unit 20 or the power distribution grid CP. In a time zone when power consumption of the load LD is relatively large, it is configured to be able to reduce electric power supplied to the load LD from the power distribution grid CP by supplying the charged electric power to the load LD.

Electric power from the battery unit 30 is supplied to the load LD through the power supply line SL2 and the power supply line SL0. The power supply line SL2 is a DC bus line. The power supply line SL2 is connected to the power supply line SL0 and the power supply line SL1 through the below-mentioned grid interconnection inverter 40.

The battery unit 30 has a battery 31 and a DC/DC converter 32. The battery 31 is a rechargeable battery provided by a lithium ion battery or a nickel hydride battery. The DC/DC converter 32 is an electric power converter for stepping up voltage of DC power from the battery 31 and supply increased DC power to the power supply line SL2. That is, the DC/DC converter 32 can be said to adjust voltage between the power supply line SL2 and the battery 31 and to connect them.

One DC/DC converter 32 is disposed to corresponding one battery 31. As shown in FIG. 1, in this embodiment, 2 sets of batteries 31 and DC/DC converters 32 are connected in parallel to the power supply line SL2. The number of the batteries 31 and the DC/DC converters 32 is not restricted to two sets, but may be increased or decreased according to a scale of the factory FC or a capacity of the battery 31.

The grid interconnection inverter 40 is an electric power converter which transforms DC electric power from the power supply line SL2 into AC electric power, and supplies it to the power supply line SL0. The grid interconnection inverter 40 is an electric power converter which transforms AC electric power from the power supply line SL0 and the power supply line SL1 into DC electric power, and supplies it to the power supply line SL2. That is, the grid interconnection inverter 40 enables bidirectional power supply between the power supply line SL2 and the power supply line SL0 or the power supply line SL1.

A controller 100 according to an embodiment of the present disclosure is explained. The controller 100 may be a part of computer systems which perform integrated control of the whole power supply system PS. The controller 100 controls operation of the battery unit 30. The controller 100 has a master control module (MST-CNT) 100A and a slave control module (SLV-CNT) 100B.

The master control module 100A is a subsystem for controlling one of two DC/DC converters 32. The slave control module 100B is a subsystem for controlling the other one of two DC/DC converters 32. The master control module 100A and the slave control module 100B are provided by systems which each has CPU, ROM, RAM, and an I/O interface.

Each control module is an electrical control unit (ECU). The control module has at least one processing unit (CPU) and at least one memory device (MMR) provided as a storage medium which stores a set of program and data. The control module is provided with a microcomputer having the storage medium readable by a computer. The storage medium is a non-transitory storage medium which stores a program readable by the computer. The storage medium can be provided by a device, such as a solid state memory device and a magnetic disc memory. The control module is provided with one computer, or a set of computer resources linked by a data communication device. The program, when executed by the control module, makes the control module to function as devices described in this specification, and makes the control module to perform methods described in this specification. The control module provides a plurality of various elements. At least a part of those elements may be called as means for performing functions, and, in another aspect, at least a part of those elements may be called as structural blocks or sections.

In subsequent description, one DC/DC converter 32 controlled by the master control module 100A is also referred to as a DC/DC converter 32A. Another DC/DC converter 32 controlled by the slave control module 100B is also referred to as a DC/DC converter 32B. A battery 31 connected to the DC/DC converter 31A is also referred to as a battery 31A. Another battery 31 connected to the DC/DC converter 31 is also referred to as a battery 31B.

Figure 2:
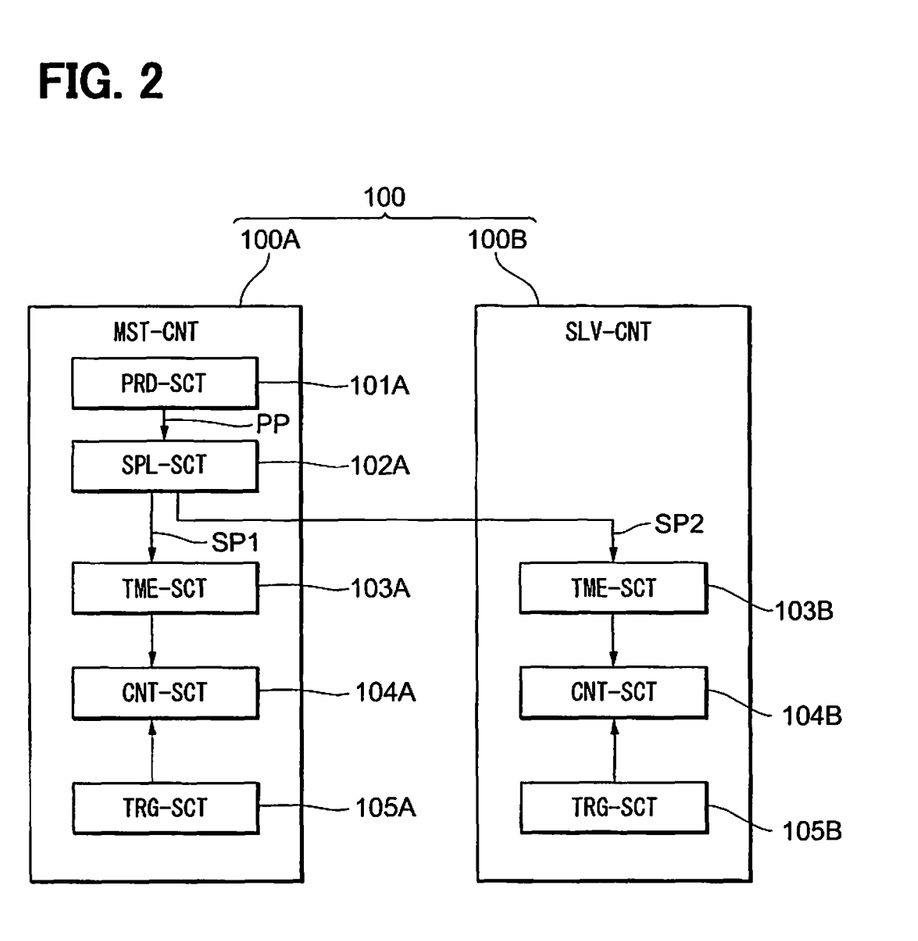
FIG. 2 is a block diagram of a controller.

As shown in FIG. 2, the master control module 100A has functional control blocks including a predicting section (PRD-SCT) 101A, a supply electric energy computing section (SPL-SCT) 102A, and a time computing part (TME-SCT) 103A. The master control module 100A may further have a control section (CNT-SCT) 104A for controlling the corresponding one converter, i.e., the DC/DC converter 32A. The master control module 100A may further have a target output computing section (TRG-SCT) 105A.

The slave control module 100B also has functional control blocks including a time computing section (TME-SCT) 103B. The slave control module 100B may further have a control section (CNT-SCT) 104B for controlling the corresponding one converter, i.e., the DC/DC converter 32B. The slave control module 100B may further have a target output computing section (TRG-SCT) 105B.

When the discharge time computed by the time computing section is shorter than a threshold time which is predetermined, the target output computing section 105A and/or 105B and the control section 104A and/or 104B are activated and used to control the DC/DC converter 32A and/or 32B. In this case, the target output computing section 105A and/or 105B computes a target output power by dividing the predicted electric energy by a threshold time. The control section 104A and/or 104B controls corresponding one of the electric power converters so that electric power corresponding to the target output power is supplied to the load only for the threshold time within the assessment period.

Figure 3:
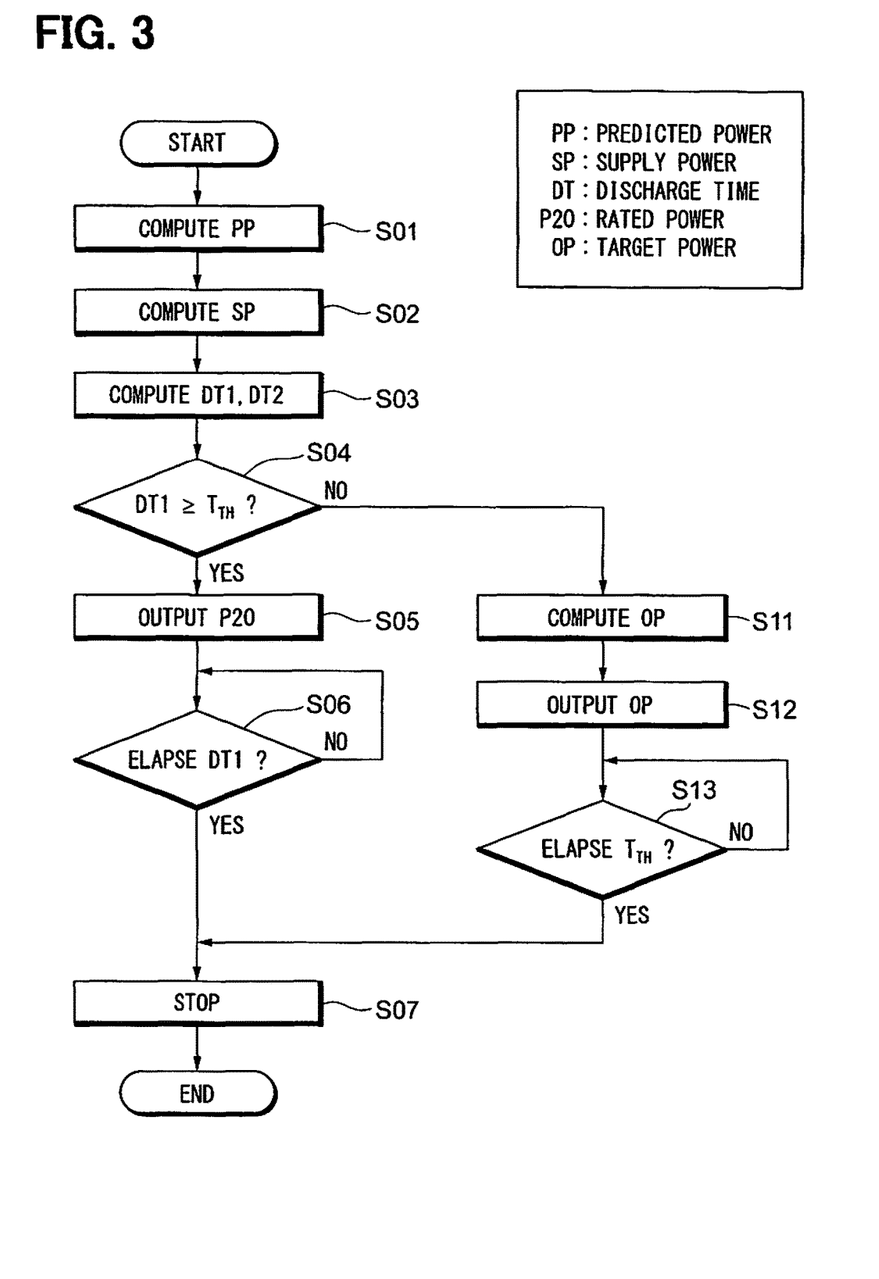
FIG. 3 is a flow chart showing control process.

Functions of control blocks and a processing flow of operation performed by the controller 100 are explained referring to FIG. 3. The operation shown in FIG. 3 is repeatedly performed by the controller 100 every 30 minutes. Starting time of the operation is on the hour, i.e., 0 minute, and 30 minutes past the hour. In addition, a period for performing the operation one time, i.e., a period of elapsing 30 minutes from a beginning of execution of the first step S01, is also referred to as an assessment period TM. Hereinafter, step may be abbreviated by symbols S.

In S01, computing a predicted electric energy PP is performed by the predicting section 101A. The predicted electric energy PP is predicted as an electric energy to be supplied from the power distribution grid CP to the load LD during the assessment period TM. The assessment period TM is 30 minutes from now.

A sensor (not illustrated) for measuring electric power currently supplied to the load LD from the power distribution grid CP is installed in the factory FC. Electric power measured by the sensor is always transmitted to the predicting section 101A as real time information. The predicting section 101A computes a predicted electric energy PP based on a magnitude of electric power currently supplied to the load LD from the power distribution grid CP and changing component in time, i.e., differential value. The algorithm for computing the predicted electric energy PP is not limited, and can adopt one of available and known algorithms. Value of the predicted electric energy PP computed by the predicting section 101A is transmitted to the supply electric energy computing section 102A.

In S02, a supply electric energy SP is computed by the supply electric energy computing section 102A. The supply electric energy SP is a minimum electric energy necessary to be supplied from the battery unit 30 so that an electric energy actually supplied to the load LD from the electric power distribution grid CP for the assessment period TM will not exceed an upper limit predetermined by a contract between the consumer and the power supply company. The electric energy actually supplied to the load LD may be referred to as an accumulated electric energy. The upper limit may be referred to as a contracted upper limit. In other words, the supply electric energy SP is a target value of electric energy which should be outputted to the power supply line SL2 from the battery unit 30 during 30 minutes period from now on, i.e., the assessment period TM.

The supply electric energy SP is computed by subtracting a contracted upper limit from the predicted electric energy PP. When the predicted electric energy PP is smaller than the contracted upper limit, the supply electric energy SP is set as zero. In this case, electric power supply from the battery unit 30 to the load LD is not performed in the assessment period TM.

The supply electric energy computing section 102A distributes computed supply electric energy SP into two portions, one for a first supply electric energy SP1 and the other for a second supply electric energy SP2. The first supply electric energy SP1 is a target value of electric energy which is taken out from the battery 31A and outputted to the power supply line SL2 from the DC/DC converter 32A in the assessment period TM. The second supply electric energy SP2 is a target value of electric energy which is taken out from the battery 31B and outputted to the power supply line SL2 from the DC/DC converter 32B in the assessment period TM. The first supply electric energy SP1 is transmitted to the time computing section 103A in the master control module 100A. The second supply electric energy SP2 is transmitted to the time computing section 103B in the slave control module 100B.

In S03, discharge time DT1 and DT2 are computed. The discharge time DT1 is a target value of time when electric power is outputted to the power supply line SL2 from the DC/DC converter 32A. As it is also described later, output of electric power from the DC/DC converter 32A is not continuously performed for the whole assessment period TM, but is only performed for the discharge time DT1 within the assessment periods TM.

Discharge time DT1 is computed by the time computing section 103A based on the first supply electric energy SP1 transmitted from the supply electric energy computing section 102A. Specifically, the discharge time DT1 is computed by dividing the first supply electric energy SP1 (Unit: kWh) by the rated power (Unit: kW) of the DC/DC converter 32A.

The discharge time DT2 is a target value of time during which electric power is outputted to the power supply line SU from the DC/DC converter 32B. Electric power output from the DC/DC converter 32B is not continuously performed in the whole assessment period TM, but is performed only for the discharge time DT2 within the assessment periods TM.

The discharge time DT2 is computed by the time computing section 103B based on the second supply electric energy SP2 transmitted from the supply electric energy computing section 102A. Specifically, the discharge time DT2 is computed by dividing the second supply electric energy SP2 (Unit: kWh) with the rated power (Unit: kW) of the DC/DC converter 32B.

The master control module 100A and the slave control module 100B perform the process shown by steps after S04 in a parallel manner. For this reason, hereinafter, process performed by the master control module 100A is mainly explained. Descriptions for the same process performed in the slave control module 100B are omitted.

In S04, it is determined that whether the discharge time DT1 computed is equal to or longer than the threshold time Tth predetermined or not. The threshold time Tth is predetermined as time slightly longer than a response time constant of the DC/DC converter 32A. In a case that the discharge time DT1 is a short period shorter than the threshold time Tth, it is difficult to perform the electric power output in such a short time by the DC/DC converter 32A. Accordingly, as explained later, adjustment for the discharge time DT1 and the first supply electric energy SP1 is performed.

In S05, the master control module 100A controls the DC/DC converter 32A to take out electric power charged in the battery 31A, and to output electric power to the power supply line SL2. Electric power outputted from the DC/DC converter 32A at this time is electric power equivalent and corresponding to the rated power, i.e., the rated power P20, of the DC/DC converter 32A. S05 provides a control section which controls the electric power converter 32A so that an electric power corresponding to the rated power P20 is supplied to the load only for the discharge time DT1 within the assessment period TM.

In S06, the master control module 100A determines that whether the discharge time DT1 has elapsed or not after the output operation of electric power is started from the DC/DC converter 32A. If the discharge time DT1 has elapsed, the process advances to S07. If the discharge time DT1 has not elapsed yet, the determining process is repeated while continuing the output operation of electric power from the DC/DC converter 32A.

In S07, the master control module 100A controls the DC/DC converter 32A to stop the output operation of electric power.

Figure 4:
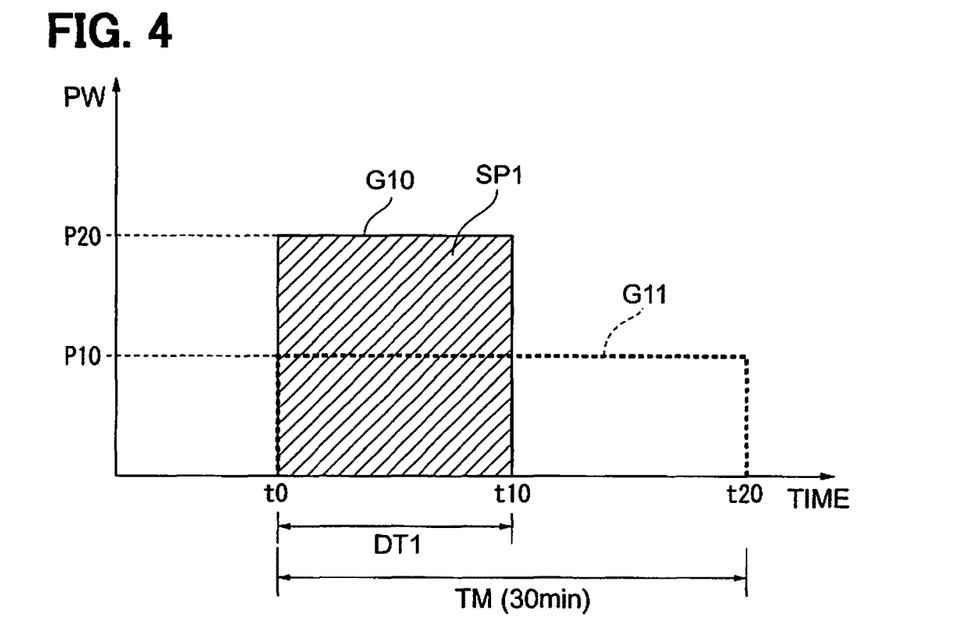
FIG. 4 is a graph showing electric power (PW) supplied to a load from an electric power converter.

Line G10 in FIG. 4 is a graph showing electric power outputted from the DC/DC converter 32A along time. In FIG. 4, a time t0 is a starting time of the assessment period TM. A time t20 is a finishing time of the assessment period TM. That is, the time t20 is a time when 30 minutes has elapsed since the time t0. A time t10 is a time when the discharge time DT1 has elapsed since the time t0.

As shown in FIG. 4, the output operation of electric power from the DC/DC converter 32A is started almost simultaneously, i.e., at the time t0, with an initiation of the assessment period TM by the above-mentioned control of the master control module 100A which is described in S05. The output operation of the rated power P20 from the DC/DC converter 32A is continuously performed from the time t0 to the time t10. The electric power supply from the DC/DC converter 32A is stopped after the time t10, i.e., a period from t10 to t20 by the master control module 100A which is described in S07.

Electric energy supplied from the DC/DC converter 32A during the assessment periods TM is electric energy acquired by multiplying the discharge time DT1 and the rated power P20. This total electric energy is equal to the acreage inside the line G10 in FIG. 4, i.e., an area indicated with cross-hatching, and equal to the first supply electric energy SP1 computed in S02.

Moreover, the same control as the above is performed by the slave control module 100B. The rated power of the DC/DC converter 32B is outputted from the DC/DC converter 32B during a period until the discharge time DT2 elapses from the time t0. As a result, the electric energy supplied from the DC/DC converter 32B during the assessment period TM becomes equal to the second supply electric energy SP2 computed in S02.

Electric energy supplied from the battery unit 30 to the load LD during the assessment period TM is equal to the sum of the first supply electric energy SP1 and the second supply electric energy SP2, i.e., the supply electric energy SP. As already described, the supply electric energy SP is the minimum electric energy required to be supplied from the battery unit 30 so that the accumulated electric energy actually supplied from the power distribution grid CP to the load LD during the assessment period TM does not exceed the contracted upper limit defined by the contract with the power supply company. Since such the supply electric energy SP is supplied to the load LD during the assessment period TM, the accumulated electric energy in the assessment period TM does not exceed the contracted upper limit.

In a period from t10 to t20 within the assessment period TM, since electric power supply from the battery unit 30 is not performed, electric power supplied from the power distribution grid CP to the load LD becomes large temporarily. Accordingly, a peak value of electric power supplied from the power distribution grid CP becomes high. Therefore, it may be considered that the contracted basic fee for the next contract period to be paid to the power supply company may be increased.

However, the contracted basic fee is usually defined according to an accumulated electric energy, and is not defined according to a momentary peak value of electric power supplied from the power distribution grid CP. That is, even if a high peak value exists within 30 minutes, i.e., the assessment period TM, in a case that the accumulated electric energy for 30 minutes is still lower than a threshold, the contracted basic fee for the next contract period, i.e., year, may not be increased adversely. Also in the above case, no payment of a penalty is needed. Therefore, it is possible to prevent an increase of the contracted basic fee for the next contract period by the above mentioned control performed by the controller 100.

By the way, it seems that if it is required to only set the accumulated electric energy below the contracted upper limit, magnitude of electric power outputted from the DC/DC converter 32A may be set smaller than the rated power P20. For example, even in a case that electric power P10 obtained by dividing the first supply electric energy SP1 by a length of the assessment period TM is outputted from the DC/DC converter 32A for a period from t10 to t20, electric energy supplied from the DC/DC converter 32A for the assessment period TM will be equal to the first supply electric energy SP1. Change of electric power in this case is illustrated in FIG. 4 by a line G11.

Above mentioned theory can be also applicable to the DC/DC converter 32B. Therefore, even if electric power lower than the rated power is outputted from the DC/DC converter 32B, it is still possible to make electric energy supplied from the DC/DC converter 32B equal to the second supply electric energy SP2.

However, this embodiment is designed to output the rated power from the DC/DC converter 32A and the DC/DC converter 32B respectively, by taking operating efficiencies in consideration. This point is explained referring to FIG. 5.

Figure 5:
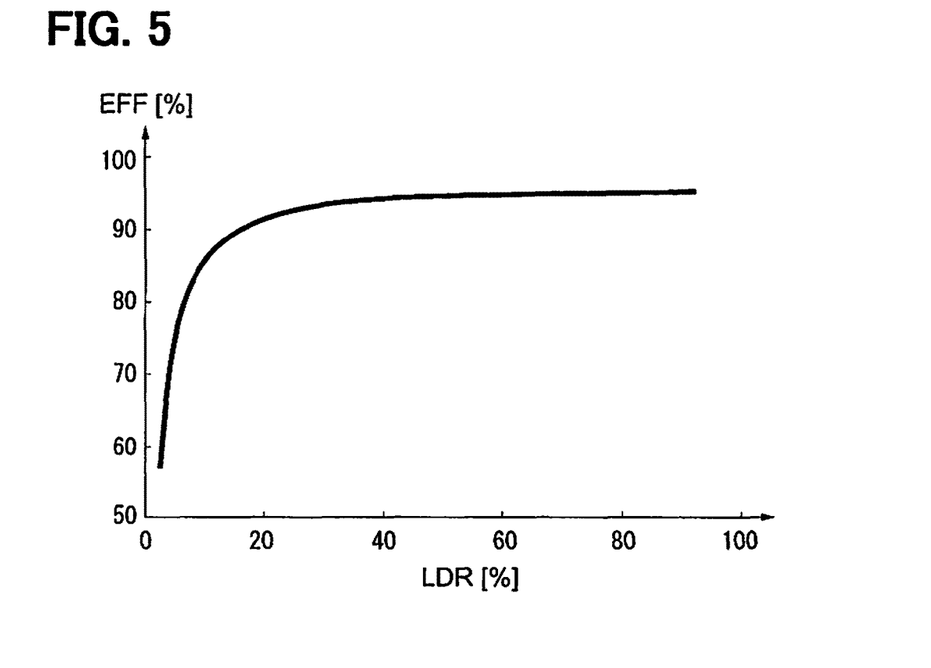
FIG. 5 is a graph showing a relationship between a load rate (LDR) and an efficiency (EFF) in an electric power converter.

A relationship between a load rate and an efficiency of the DC/DC converter 32A is shown in FIG. 5. The load rate LDR on the horizontal axis is a rate of electric power inputted to the DC/DC converter 32A, i.e., electric power outputted from the battery 31, with respect to the rated power P20 of the DC/DC converter 32A. Accordingly, as electric power taken out from the battery 31 decreases, the load rate is also decreased. As electric power taken out from the battery 31 increases, the load rate is also increased. When the load rate is 100%, electric power almost equal to the rated power P20 is taken out from the battery 31.

Efficiency on the vertical axis is a ratio of the output electric power from the DC/DC converter 32A to the input electric power to the DC/DC converter 32A. In a case of constant output power from the battery 31, i.e., constant input power to the DC/DC converter 32A, output electric power from the DC/DC converter 32A is increased as the efficiency increases, contrary, output electric power from the DC/DC converter 32A is decreased as the efficiency decreases. In a case of 100% efficiency, DC/DC converter 32A may output electric power almost equal to electric power taken out from the battery 31.

As shown in FIG. 5, in case of the DC/DC converter 32A, the efficiency EFF increases as the load rate LDR increases. When the load rate LDR is 100%, the efficiency EFF takes the highest value that is close to 100%. That is, in a case of the DC/DC converter 32A, as electric power outputted is increased, electric power taken out from the battery 31 is outputted with lower loss. Accordingly, this embodiment is designed to output the rated power P20 only for the discharge time DT1, and not output the electric power P10 during the assessment period TM in a continuous manner, when it is required to output electric power from the DC/DC converter 32A in the assessment period TM. As a result of such control being performed by the controller 100, i.e., the master control module 100A, charged electric power in the battery 31 can be taken out and supplied to the load LD with almost no loss.

Returning to FIG. 3, processing for a case in which the determination in S04 is NO, that is, the computed discharge time DT1 is less than the threshold time Tth, is explained. In this case, the processing branches to S11 from S04.

In S11, a target output power OP is computed. The target output power OP is computed by dividing the first supply electric energy SP1 computed at S02 by a threshold time Tth. Since the threshold time Tth is longer than the discharge time DT1, a value of the target output power OP computed by dividing the supply electric energy SP1 by the threshold time Tth turns into a value smaller than the rated power P20.

In S12, the master control module 100A controls the DC/DC converter 32A to take out charged electric power in the battery 31A, and to output it to the power supply line SL2. Electric power outputted from the DC/DC converter 32A at this time is equivalent to and corresponding to the above-mentioned target output power OP.

In S13, the master control module 100A determines that whether or not the threshold time Tth has elapsed after electric power output from the DC/DC converter 32A is started. If the threshold time Tth has elapsed, the processing proceeds to S07. If the threshold time Tth has not elapsed yet, the determining process is repeated while continuing the output operation of electric power from the DC/DC converter 32A. Thus, the processing performed after S11 is similar to the processing in S05 and S06. In the processing, target electric power to be outputted from the DC/DC converter 32A is replaced from the rated power P20 to the target output power OP, and the discharge time DT1 is replaced to the threshold time Tth.

In a case that the discharge time DT1 is shorter than the response time constant of the DC/DC converter 32A, the DC/DC converter 32A cannot perform appropriately in response to the control, i.e., a control signal demanding electric-power output, from the master control module 100A. In the above mentioned case, control in a range in which the DC/DC converter 32A can perform appropriately in response to the control signal is performed. In this case, since outputted electric power, i.e., the target output power OP, is smaller than the rated power P20, the efficiency is slightly lowered. However, the electric energy outputted from the DC/DC converter 32A during the assessment period TM will be equal to the first supply electric energy SP1. That is, it is possible to perform control that can suppress decrease of the efficiency as small as possible, and can keep the accumulated electric energy during the assessment period TM lower than the contracted upper limit.

As shown in FIG. 4, in this embodiment, the master control module 100A includes a section which controls the DC/DC converter 32A, or controls the DC/DC converter 32A so that an electric power output from the DC/DC converter 32A is performed for a continuous time zone within the assessment period TM. In other words, an electric power supply to the load LD from the electric power converter 32A is performed for a continuous time zone from t0 to t10 within the assessment period TM.

Figure 6:
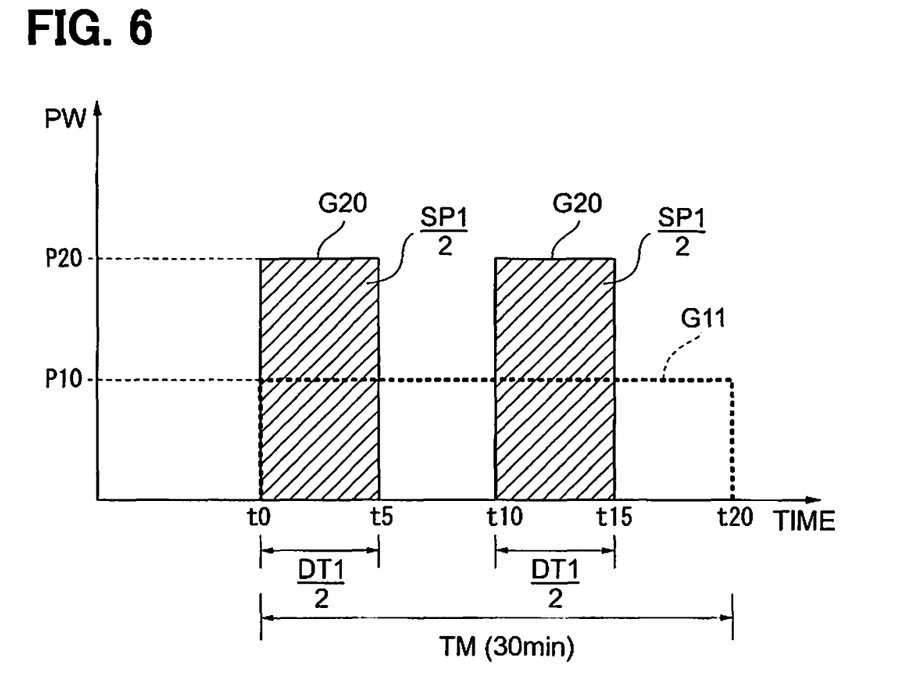
FIG. 6 is a graph showing electric power (PW) supplied to a load from an electric power converter.

The scope of the present disclosure is not limited by the above mentioned embodiments. For example, electric power output from the DC/DC converter 32A may be divided into a plurality of time zones, and performed. A line G20 in FIG. 6 is a graph showing electric power outputted from the DC/DC converter 32A in a case of this control. In FIG. 6, a time t5 is a time when a half of the discharge time DT1 has elapsed since the time t0. A time t15 is a time when a half of the discharge time DT1 has elapsed since the time t10.

In a case illustrated in FIG. 6, output of the rated power P20 from the DC/DC converter 32A is started almost simultaneously, i.e., at the time t0, with an initiation of the assessment period TM. The output operation of the rated power P20 from the DC/DC converter 32A is continuously performed from t0 to t5. Electric power output from the DC/DC converter 32A is temporarily suspended during a period from t5 to t10. After the time t10, the output operation of the rated power P20 from the DC/DC converter 32A is resumed and continuously performed from t10 to t15. Electric power output from the DC/DC converter 32A is suspended again from 15 to t20.

Each of electric energy outputted from the DC/DC converter 32A in a period from t0 to t5 and electric energy outputted from the DC/DC converter 32A in a period from t10 to t15 are equal to a half of the first supply electric energy SP1. As a result, the electric energy supplied from the DC/DC converter 32A during the assessment period TM is equal to the first supply electric energy SP1.

By using this control, it is also possible to obtain high efficiency in operation for taking out charged electric power in the battery 31 and supplying it to the load LD. It is also prevented certainly that the accumulated electric energy in the assessment period TM exceeds the amount of contracted electric energy.

However, in this control, there is a slightly lowering tendency of efficiency, since value of electric power outputted from the DC/DC converter 32A is switched plural times. Therefore, it is desirable to perform electric power output from the DC/DC converter 32A is performed for a single continuous time zone as indicated by a control shown in FIG. 4.

In the above, the embodiments that has two sets of the battery 31 and the DC/DC converter 32 are explained. In a case that there are more numbers of sets of the battery 31 and the DC/DC converter 32, the number of the slave control modules 100B may be increased corresponding to the number of sets. In this case, the supply electric energy SP computed by the supply electric energy computing section 102A of the master control module 100A is distributed to a plurality of supply electric energy for the slave control modules 100B. The plurality of supply electric energy is transmitted, i.e., sent, to the slave control modules 100B, respectively. Then, each slave control module 100B performs the control as mentioned above.

In the above, embodiments are described by referring to specific examples. The present disclosure is not limited to such examples described above. Some modification in which a person skilled in the art added minor design changes, as long as those modifications have features of the present disclosure, are included within a technical scope of the present disclosure. For example, each element included in the embodiments, and arrangement, material, condition, configuration, size, and etc. of the element are not necessarily limited to the described embodiments, and may be modified suitably. Moreover, each element included in the embodiments may be combined as long as it is technically possible. Such combined embodiments, as long as it has features of the present disclosure, should be included within a technical scope of the present disclosure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations are preferred, other combinations and configurations, including more, less or only a single element, are also within the spirit and scope of the present disclosure.

What is claimed is:

1. An electric power supply system controller for a power supply system which supplies electric power charged in a battery to a load through an electric power converter, the controller comprising:
   a predicting section configured to compute a predicted electric energy predicted to be supplied from a power distribution grid to the load during an assessment period which is a predetermined period;
   a supply electric energy computing section configured to compute a supply electric power based on the predicted electric energy, the supply electric energy being an electric energy to be supplied to the load from the electric power converter during the assessment period;
   a time computing section configured to compute a discharge time by dividing the supply electric energy by a rated power of the electric power converter;
   a control section configured to control the electric power converter so that an electric power corresponding to the rated power is supplied to the load only for the discharge time within the assessment period; and
   a target output computing section configured to compute a target output power by dividing the predicted electric energy by a threshold time, when the discharge time computed by the time computing section is shorter than the threshold time which is predetermined, wherein
   the control section controls the electric power converter so that an electric power supply to the load from the electric power converter is performed for a continuous time zone within the assessment period and
   the control section controls the electric power converter so that electric power corresponding to the target output power is supplied to the load only for the threshold time within the assessment period.

* * * * *